United States Patent Office 2,769,564
Patented Nov. 6, 1956

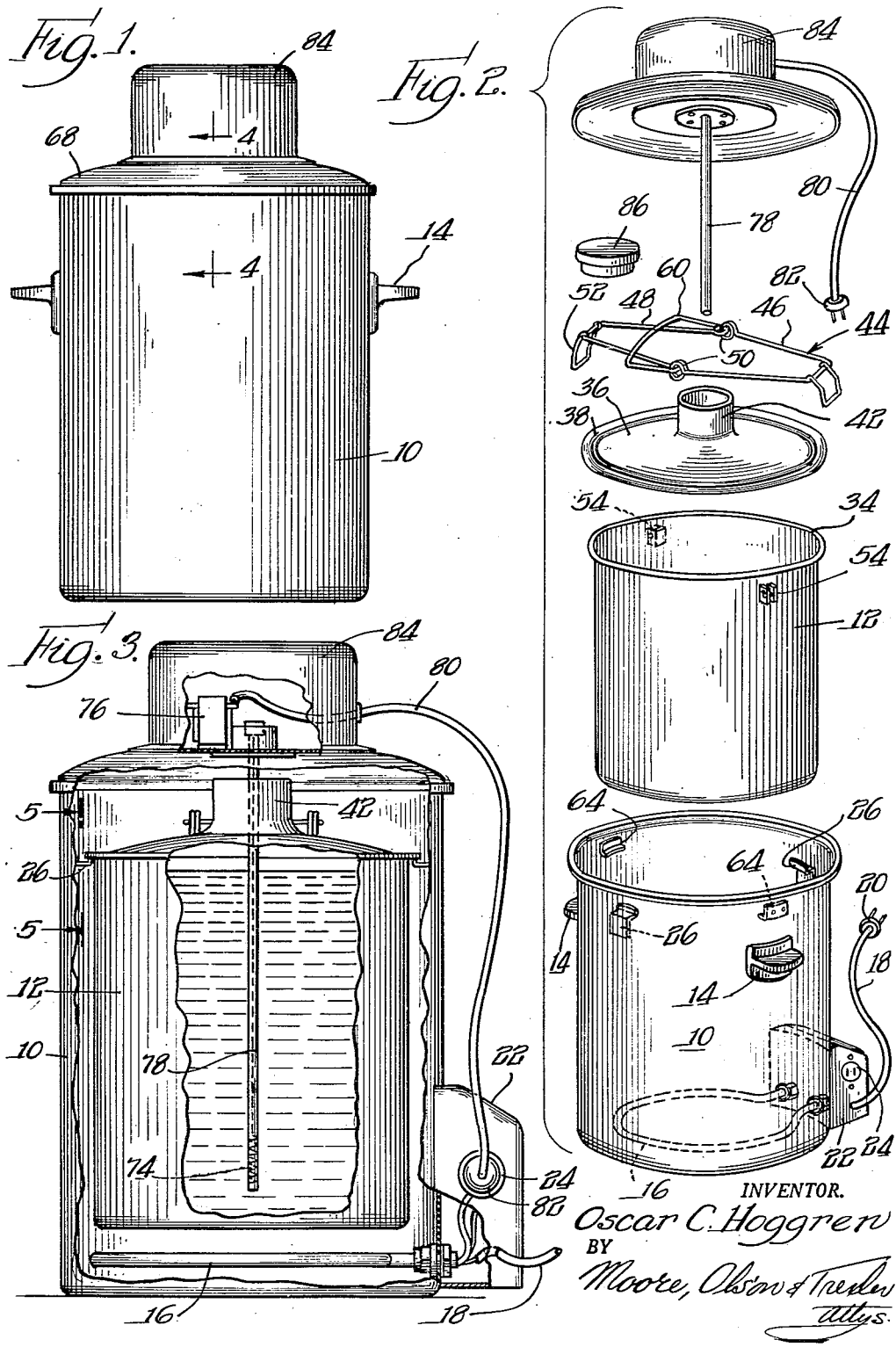

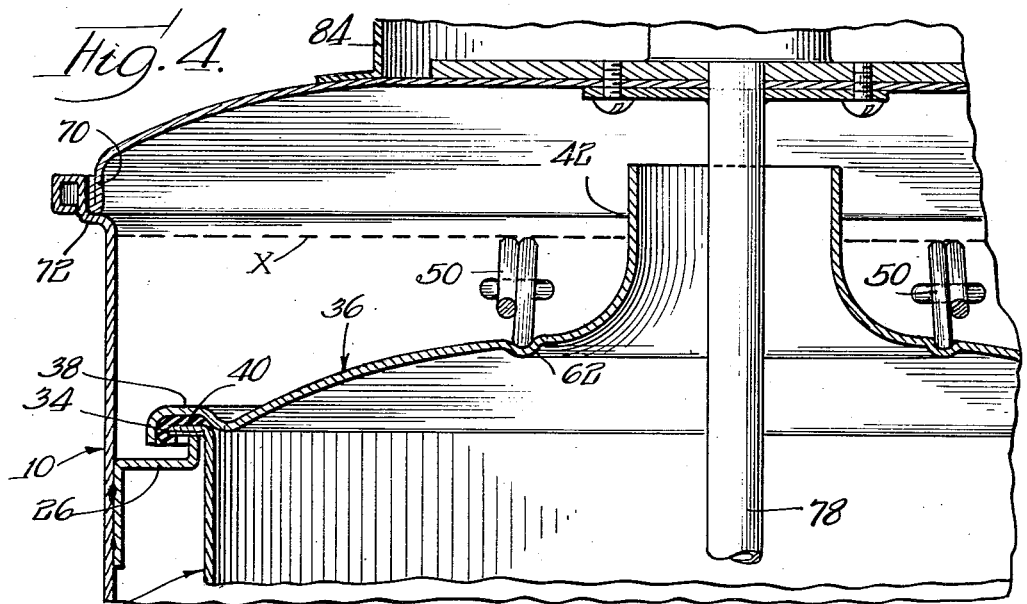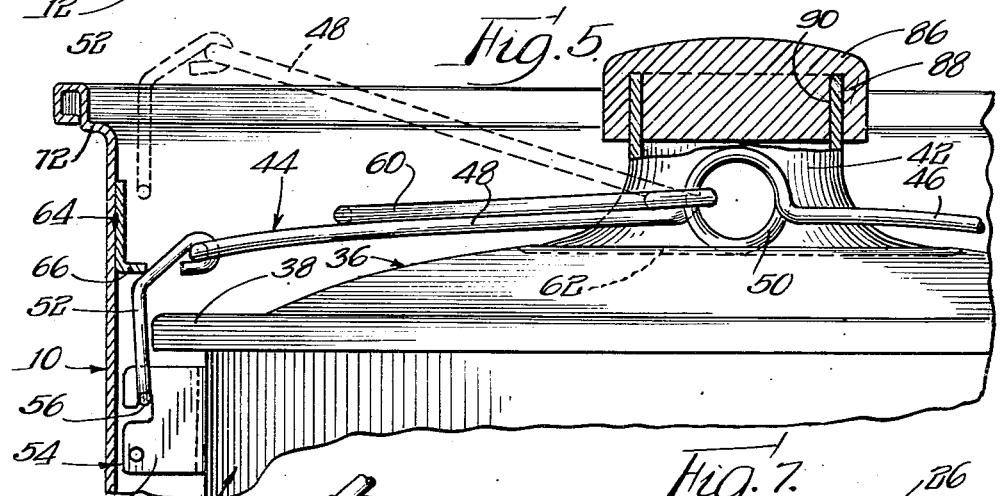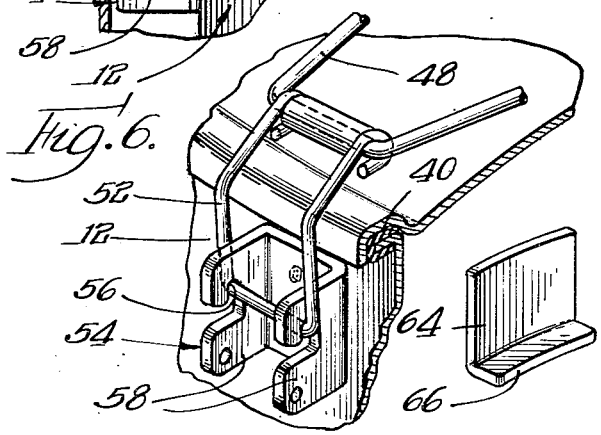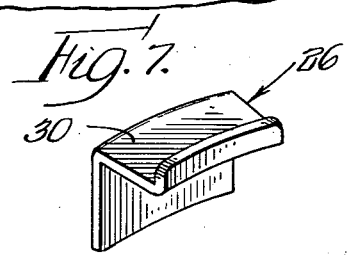
INVENTOR.
Oscar C. Hoggren

2,769,564

PORTABLE MILK PASTEURIZER

Oscar C. Hoggren, Chicago, Ill.

Application January 13, 1954, Serial No. 403,793

1 Claim. (Cl. 220—13)

This invention relates to a home pasteurizer for pasteurizing small quantities of liquid milk products and other liquid food products.

The great increase in the number of cases of undulant fever in this country due to the consumption of raw milk and raw milk products by people living on farms, in villages and in towns, makes it imperative that these products be pasteurized before they are used for human consumption. The number of cases of undulant fever can be greatly reduced by the universal use of a reliable home pasteurizer.

In pasteurizing milk and milk products commercially, there are two United States Public Health standards in use today. In one, known as the holding method, the milk or other liquid must be maintained at a temperature of at least 142 degrees F. for a period of at least 30 minutes. In the other method, known as the high temperature short time method, the milk or other liquid must be maintained at a temperature not below 160 degrees F. for fifteen seconds.

This pasteurizer fulfills the highly exacting requirements of a pasteurizer in that every particle of milk is heated to a temperature sufficiently high to give a phosphatase test of less than 2 units as indicated by the New York City Laboratory Method I as published in Standard Methods of Milk Analysis by the American Public Health Association and also by the same standard which is published in Official and Tentative Method by the Association of Official Agricultural Chemists. Furthermore this pasteurizer fulfills exacting requirements in that all surfaces of the milk container which come in contact with the milk or other liquid are also heated to a temperature sufficiently high to give a negative phosphatase test as indicated by the cotton swab technique. Proper care and cleanliness of the pasteurizer is facilitated by the structure which will enable the portions of the pasteurizer which come in contact with the milk or other liquid to be easily, thoroughly and quickly sterilized. It is, therefore, a primary object of this invention to provide a relatively simple and inexpensive yet highly efficient and sturdy pasteurizer.

Heating above 168 degrees F. produces an unpleasant taste in pasteurized milk, while standing at elevated temperatures such as 140 degrees F. for prolonged periods of time causes separation of the cream in the milk, thus affecting the natural flavor of the product. Therefore, another object of this invention is to provide a pasteurizer which will effectively pasteurize milk and milk products without imparting an unpleasant taste to the product.

It is important that every portion of the milk and every part of the pasteurizing apparatus be subjected to the proper temperature for the appropriate length of time as called for by one of the aforesaid United States Public Health Standards. This treatment is necessary to kill the pathogenic organisms and any undesirable bacteria. It is also well known that cream has a tendency to rise during the pasteurization process, and carries with it the above mentioned undesirable bacteria. For this reason, it is very important that the upper area of the container be subjected to the pasteurization conditions specified above so as to completely kill the aforesaid bacteria carried up by the cream. The present invention solves this problem by providing a container for the milk undergoing pasteurization which is substantially, completely submerged within a suitable heating medium such as water.

It has also been shown by competent investigators that aside from the United States Public Health Service Standards for pasteurization, referred to above, a great number of time-temperature relationships can be used to achieve positive pasteurization. Any of these time-temperature relationships can be used with the present invention.

As is well known, foreign odors are given off during pasteurization and these should be removed in the process. Still another object of this invention then is to provide a pasteurizer which will facilitate removal of some foreign odors from the liquid milk products and other food products being pasteurized, without impairing the heat treatment thereof.

The pasteurization process should not destroy or impair the food value of the milk or milk products. One important food element in milk is vitamin C (ascorbic acid) which is present in milk to the extent of 18–30 milligrams per quart. This is a considerable portion of the vitamin C requirement for the human body. This vitamin is oxidized by oxygen in the atmosphere to the physiologically inactive dehydroascorbic acid during pasteurization and storage, which is easily destroyed by heat. The present invention reduces the amount of oxygen in contact with the milk to a low level because of the small opening or mouth, and a stopper therefor which provides a vacuum seal for the container after pasteurization during cooling and storage.

The vitamins riboflavin and pyridoxine are gradually destroyed by light. The small opening or mouth closed with a stopper excludes light during cooling and storage.

This small opening not only excludes oxygen and light from the milk or other liquid during cooling and storage, but it also provides a convenient and sanitary pouring lip making it unnecessary to pour the pasteurized liquid into another vessel for serving. Furthermore, the cream which has risen on standing may be easily remixed by shaking the milk container.

The milk or other liquid in the container which is sealed with the stopper, can be cooled by placing the container under a stream of running water, by setting it in a bucket of water, or by immersing it in a tank of water or in a milk cooling tank. Immersing a sealed container into a tank of water or milk cooling tank eliminates the necessity of building special shelves or brackets for supporting the container in the tank or cooler, or of building into the pasteurizer special cooling devices.

The foregoing and other objects will become more apparent from the following specification and the accompanying drawings in which:

Figure 1 is a side elevational view of a portable pasteurizer made according to the present invention;

Figure 2 is an exploded view showing the relation of the various parts one with another;

Figure 3 is a side elevational view shown partly in cross section to illustrate the general construction of the pasteurizer;

Figure 4 is a cross sectional view taken in the direction of the arrows along line 4—4 of a portion of the pasteurizer shown in Figure 1;

Figure 5 is a partial cross sectional view taken along line 5—5 of Figure 3 showing the details of the cover construction of the milk container;

Figure 6 is an enlarged perspective view showing the latch of the milk container cover clamp engaging the latching bracket;

Figure 7 is an enlarged perspective view of one of the milk container supports; and Figure 8 is an enlarged perspective view of one of the milk container latching brackets.

The pasteurizer shown in these drawings broadly consists of an outer container 10 preferably made of suitable light weight material such as aluminum for holding the heating medium and an inner container 12 made of suitable non-corrosive material such as aluminum or stainless steel or any other material of reasonably comparable heat conductivity for accommodating the material to be pasteurized such as milk. As best seen in Figures 1, 2 and 3 the outer container 10 may be provided with handles 14 which are suitably secured such as by screws or rivets. Means is provided in the lower portion of the outer container 10 for heating the pasteurizing medium. A preferred heating means consists of an electrical heating coil 16 which may comprise a suitable heating element supported in an outer coiled tube and insulated therefrom. The heating element may be connected through a conductor 18 and plug 20 with a suitable source of electrical current. This heating element is so designed as to give efficient and effective heating for the pasteurizing. A housing 22 is suitably attached to the side of the outer container 10 in such a position as to cover the connection between heating element 16 and conductor 18. An electrical connector 24, the purpose of which will hereinafter be explained, is also mounted on one side of housing 22.

Two or more supporting brackets 26 are suitably attached as by spot welds to the inner wall of outer container 10 toward the upper end thereof to support the milk container 12 during the pasteurization operation. As seen in Figure 7 this bracket 26 includes a vertical section secured to container 10 and an upper laterally extending portion 30, the outer end of which is bent upwardly to form a support for the milk container 12.

A cover member 36 for the milk container 12 has been provided which is illustrated in Figures 2, 4 and 5. This cover member 36 fits over a laterally extending shoulder 34 which is provided on the upper edge of milk container 12. Cover member 36 is shaped to cover and cooperate with the open end of milk container 12. For this purpose a grooved portion 38 is provided on the periphery of cover member 36 which cooperates with shoulder 34 of milk container 12 to effect sealing therebetween. Some suitable gasket material 40, for example rubber or plastic, may be inserted between the grooved portion 38 and shoulder 34 to improve the seal therebetween. An aperture is provided in the cover member 36 preferably in the center thereof and a neck 42 defines this aperture and extends upwardly from closure member 36.

Cover clamp 44 has been provided to forcibly secure the cover member 36 to the milk container 12. The general structure of this cover clamp 44 is seen best in Figure 2. The embodiment shown has two laterally extending arms 46 and 48 which are joined by spring structures 50. At the outer ends of arms 46 and 48 are pivotally attached latches 52. Arms 46 and 48 and latches 52 are so connected that when in proper position for latching, arms 46 and 48 are biased upwardly from the horizontal. Latching brackets 54 are suitably attached as by welding to the outside of the milk container 12 on opposite sides thereof near the top. Latches 52 are adapted to fit into notches 56 which are formed on the outward extending portions 58 of the latching bracket thus securing the cover member 36 on the milk container 12. Handle 60 is swingably attached to the spring structures 50 to provide a carrying means on the milk container.

To clamp closure member 36 in position on milk container 12 the closure member 36 is placed in position on the shoulder 34 of milk container 12 with gasket 40 therebetween, and cover clamp 44 is placed in the position shown by dotted lines in Figure 5. Then arm 48 is urged downwardly until the latch 52 engages the notch 56 in latching brackets 54. It is seen that the tension in the arms caused by the spring structures 50 will hold cover member 36 firmly in place. The clamping members 44 are properly positioned by providing a groove 62 in the cover member 36 which will receive the spring members 50.

In normal operation the heating fluid contained in outer container 10 will substantially cover the milk container 12 and milk container cover 36 and will rise to a level such as shown by line X in Figure 4. Since ordinarily milk container 12 may not be completely filled with fluid to be pasteurized, it is quite possible that the milk container 12 will tend to float above the position it would ordinarily assume when supported by brackets 26. For this reason retaining brackets 64 which are attached to the inner wall of outer container 10 (see Figures 5 and 8) are provided to hold the milk container 12 against the supporting brackets 26. The retaining brackets 64 are so positioned that when the milk container is placed on the supports 26 and is rotated so that the latches 52 are aligned with the bracket 64, the laterally extending portion 66 of brackets 64 is pressed against the upper edge of latches 52. Any tendency for the milk container to be buoyed up and thus displaced from its proper position will be prevented by this structure.

A lid 68 is provided to close the outer container during the pasteurization heating period, and thus prevent contamination of the milk being pasteurized by the introduction of undesirable materials through the open neck 42. The lid 68 has a depending skirt portion 70 which fits into channel 72 formed on the upper edge of the outer container 10.

In addition to closing the outer container 10 the lid 68 also supports a controlling devise to prevent overheating of the milk. This controlling device is activated by a thermostat 74 and in the embodiment shown in the drawing it has a buzzer 76. The temperature responsive element of thermostat 74 is contained in a thermostat well 78 which is suitably secured as by screws to the underside of lid 68. The thermostat shown includes a tube sealed at one end containing a fluid which expands suitably over the temperature range in which the pasteurizer is to be used. The other end of the tube terminates in a closed chamber which has a flexible wall on which is mounted a switch contact. When the liquid in the tube expands sufficiently this contact is pressed against a second contact. These contacts are closed when the milk in the container 12 reaches the desired pasteurizing temperature.

In one embodiment of this invention, one of these contacts is connected to one terminal of the signalling device 76 and the other terminal of the signalling device is connected to conductor 80. The other contact on the thermostat is also connected to conductor 80. Conductor 80 is connected through plug 82 to connector 24 which in turn is connected directly across the main source of potential which is supplied through conductor 18. It will be seen therefore that when the contents of the milk container 12 reach the desired temperature, the contacts on the thermostat 74 will be closed thus closing the circuit from the main line through signalling device 76 causing signal device 76 to operate and warn the operator that the milk has reached the desired temperature. A cover 84 which is suitably attached to lid 68 protects the signal device and the signal device and thermostat connections. Other suitable audio and visual signalling devices may be used.

In another embodiment of this invention, the thermostat 74 activates a device such as a relay which opens the circuit to the heating coil 16. One of the contacts of the switch activated by the thermostat is connected to a wire of conductor 80 and through plug 24 to one of the conductors leading to the heating coil 16, and the other contact is connected to the other wire of conductor 80 and through plug 24 to one terminal of a relay (not shown)

in the housing 22. The other terminal of the relay is connected to the other conductor leading to the heating coil 16. When the relay is activated, it shuts off a switch (not shown) that controls the main supply of current to the pasteurizer. When the switch is turned on for the next operation, the relay is automatically reset. In operation, when the contents of the milk container 12 reach the desired temperature, the contacts on the thermostat 74 will close thus closing the circuit through the relay which operates the main switch thereby shutting off the power to the heating coil 16 and the relay. When using this embodiment, the operator need not stay around after he has started the pasteurizer as the heating is controlled automatically. If desired, an indicator light may be connected across the potential leading to the heating coil 16 to show the operator whether the coil is on or off. Other suitable automatic controlling devices may be used if desired.

A cap 86 is provided to close the opening in the neck during the cooling period. As seen in Figure 5, the cap used in the present invention has a depending edge 88 which fits on the outside of neck 42 and a depending edge 90 which fits on the inside of neck 42. Cap 86 is made of flexible and pliable material such as rubber or a suitable plastic of non-phenolic material may be used. The particular construction of the cap and the fact that it is pliable makes it possible to bend the outer depending edge 88 upward, thus facilitating cleaning of the space between edges 88 and 90.

A typical heating cycle using the pasteurizer of the present invention will be as follows. A predetermined amount of heating medium such as water would be placed in the outer container 10. The material which is to be pasteurized is placed in the milk container 12 after which the cover member 36 is clamped in position. Milk container 12 would be lowered into the heating medium until it rested upon the supports; then it would be rotated until the laterally extending portion 66 of retaining brackets 64 engaged the latches 52. Then the lid 68 would be placed in position on the outer container 10. As seen in Figure 3 this will place the thermostat well 78 well below the usual level of liquid to be pasteurized. Plug 82 would be inserted in receptacle 24 and plug 20 would be connected to some appropriate source of potential such as some common household electric line. As soon as the switch, if any, is turned on and the plug 20 is connected to a source of potential the heater 16 will begin to operate and will heat the heating medium in container 10. As is well known the hotter material surrounding the heating element 16 will be of a lesser density than the cooler material above it. This will result in a displacement of the warmer material surrounding the heating coil with a portion of the cooler material. This will cause a circulation of the heating medium within container 10. It is seen therefore that there will be heating by both conduction and convection. The same phenomenon will occur in the milk container 12, thus giving suitable agitation for the liquid being pasteurized so that every particle is heated sufficiently to destroy all pathogenic bacteria.

It will be apparent to those skilled in the art that the present invention is particularly adapted to be used in a modified high temperature short time method of pasteurization. The government standards for the pasteurization of milk for this method require that all portions of the milk reach a temperature of at least 160° F. and preferably less than 168° F. The thermostat 74, therefore, is adjusted to cause the contacts to be closed when the milk reaches the pasteurizing temperatures. Since the thermostat well 78 is in the center of the body of the milk being treated, the operator will be certain that all portions of the milk have reached the required minimum temperature for proper pasteurization. As soon as the contacts on thermostat 74 close, warning or signalling device 76 will operate and inform the operator that the milk is at the desired temperature, or in the automatic embodiment the heating coil is automatically shut off. Since it is necessary to keep the milk at this temperature for only 15–20 seconds to achieve the desired results, immediate removal of the milk container 12 upon sounding of the warning device 76 will be permissible.

It is seen that since the open portion of the milk container cover is small in proportion to the area of the milk container cover 36, undesirable odors which tend to rise to the top will be expelled through the neck 42 by the increase in vapor pressure of the water and the resulting increase in volume of the vapors in the area above the liquid being pasteurized. In addition to expelling the undesirable odors, this action will also tend to expel most of the oxygen in the milk and in the vacant space above the milk being treated and thus will reduce the oxidation of vitamin C in the milk.

The milk container cover construction cooperating with the retaining bracket 64 makes possible substantially complete immersion of the milk container 12 and milk container cover 36 in the heating medium. This is necessary in order to insure complete pasteurization of all of the milk without any overheating. By having the milk container submerged except for the small upstanding neck portion, effective pasteurization is accomplished without need for mechanical agitation of the liquid heating medium. Further, by having substantially all of the milk container cover 36 completely submerged, it is not necessary to add a lid heater in order to have the pasteurizer meet the accepted requirements. Heretofore portable batch pasteurizers did not hold the milk and condensate on the lid for the required time temperature, but now applicant has provided a portable batch pasteurizer that kills all the pathogenic bacteria in material on the lid as well as in the main body of the milk.

After the controlling device has operated indicating the end of the heating cycle, a close fitting cap 86 is placed over the neck 42. The milk container 12 is removed from the heating medium and immediately submerged in a cooling medium. Cooling the milk container 12 will condense most of the water vapor in the open space above the milk in the container thus reducing the pressure in this space. This will produce a partial vacuum because cap 86 fits snugly. The vacuum sealing which results from the use of such a cap in the present invention prevents atmospheric oxygen from re-entering the empty space above the milk in the container 12 during the cooling period and thus further protects the vitamin C content of the milk. The tight fit of the depending edges 88 and 90 also keeps the upper edges of neck 42, which will later form the pouring lip for poring milk from the milk container, free from contamination by the cooling medium.

The present invention fulfills all of the objects mentioned above and solves problems which heretofore have been unsolved in this particular art. There has been provided a pasteurizing apparatus which is economical and effective, whose parts that are exposed to the material being treated are capable of being easily and thoroughly sterilized, and which protects the light and oxygen sensitive vitamins in the milk being treated. The automatic controlling device which functions at the end of the heating cycle insures that the milk is heated to the proper temperature for the proper length of time, yet is not subjected to a lengthy heating period which would give a bad taste to the milk or would allow separation of the butter fat content. The rugged construction and the absence of any movable parts assure simplicity of operation and freedom from mechanical failures.

While particular embodiments of the invention have been shown by way of illustration, it is apparent that various modifications may be made therein without departing from the spirit and scope of the invention.

The present application is a continuation-in-part of my earlier application, Serial No. 63,980, filed December 7, 1948, now abandoned.

I claim:

A portable pasteurizer comprising an outer container for accommodating a liquid heating medium, an inner container disposed within said outer container, a cover means for said inner container, means for securing said cover means on said inner container in a liquid-tight manner, a laterally and outwardly extending shoulder formed on said inner container, a laterally extending bracket mounted on the inner vertical surface of said outer container and positioned to receive and support said shoulder, and restraining means mounted on the inner vertical surface of said outer container, said restraining means being adapted to engage said securing means and thereby hold said inner container against said bracket whereby positively to prevent vertical displacement of said inner container within said outer container and thereby to insure that the entire outer surface of said cover means is subjected to the pasteurizing temperature of the liquid heating medium.

References Cited in the file of this patent
UNITED STATES PATENTS

| Number | Name | Date |
|---|---|---|
| 100,863 | Corbett | Mar. 15, 1870 |
| 608,868 | Kaufmann | Aug. 9, 1898 |
| 681,406 | Chavous | Aug. 27, 1901 |
| 1,094,712 | Gale | Apr. 28, 1914 |
| 1,323,473 | Hettinger | Dec. 2, 1919 |
| 1,332,019 | Allison | Feb. 24, 1920 |
| 1,421,517 | Malcamp | July 4, 1922 |
| 1,530,416 | Saeki | Mar. 17, 1925 |
| 1,569,793 | Tomhave | Jan. 12, 1926 |
| 2,513,577 | Malme | July 4, 1950 |